R. J. BARTHOLOMEW.
TIRE.
APPLICATION FILED JAN. 4, 1916.
1,197,432.
Patented Sept. 5, 1916.
2 SHEETS—SHEET 1.
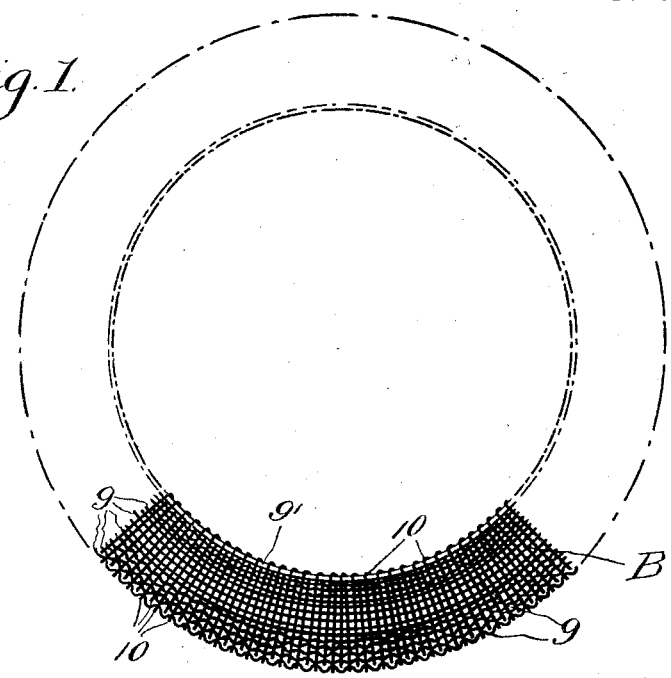
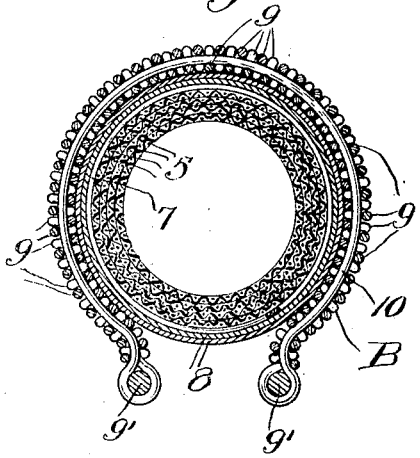
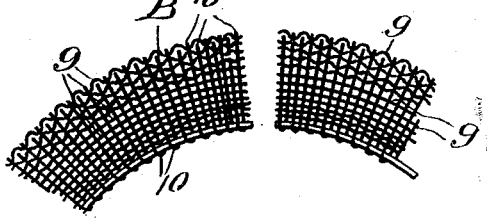
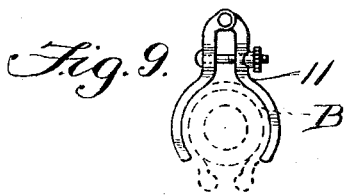
Witnesses
Inventor
Roy J. Bartholomew
By Victor J. Evans
Attorney R. J. BARTHOLOMEW.
TIRE.
APPLICATION FILED JAN. 4, 1916.
1,197,432.
Patented Sept. 5, 1916.
2 SHEETS—SHEET 2.
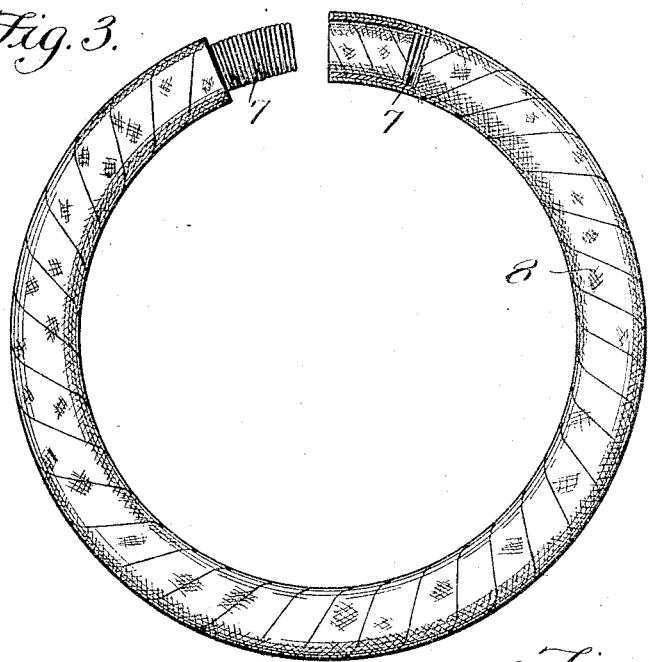
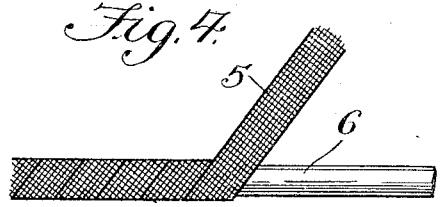
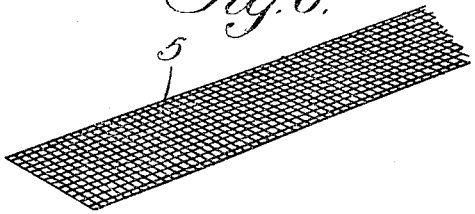
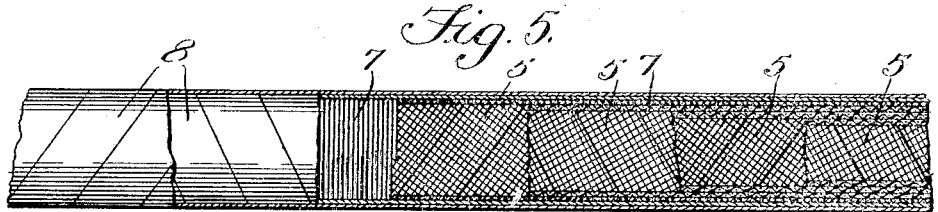
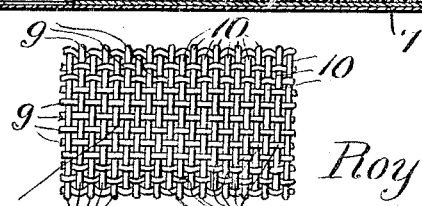
Inventor
Roy J. Bartholomew
By Victor J. Evans
Attorney
Witnesses

UNITED STATES PATENT OFFICE.

ROY J. BARTHOLOMEW, OF LEETON, MISSOURI.

TIRE.

1,197,432.  Specification of Letters Patent.  Patented Sept. 5, 1916.

Application filed January 4, 1916.  Serial No. 70,120.

*To all whom it may concern:*

Be it known that I, ROY J. BARTHOLOMEW, a citizen of the United States, residing at Leeton, in the county of Johnson and State of Missouri, have invented new and useful Improvements in Tires, of which the following is a specification.

This invention contemplates the provision of a resilient vehicle wheel tire which is puncture-proof and yet possessed of all the advantages of the pneumatic tire.

The nature and advantages of the invention will be thoroughly understood from the following description when taken in connection with the accompanying drawings, the invention residing in the construction, combination and arrangement of parts as claimed.

In the drawings forming part of this specification like numerals of reference indicate similar parts in the several views and in which:—

Figure 1 is a side elevation of a tire constructed in accordance with my invention. Fig. 2 is a transverse sectional view therethrough. Fig. 3 is a side elevation of the core with the ends separated. Fig. 4 is a view showing the manner of winding the foraminated strip about the form. Fig. 5 is a side elevation of the core partly in section showing the windings of the different strips of material. Fig. 6 is a perspective view of one of the foraminated strips. Fig. 7 is a plan view of a portion of the outer casing. Fig. 8 is a side elevation of the outer casing showing the ends separated. Fig. 9 is a view showing the manner of using the clamps.

In carrying out my invention I employ a plurality of foraminated strips 5 preferably consisting of interwoven spring steel wire, the strips being woven with a selvage to prevent raveling. The wires may be of any suitable size and the strips of any suitable dimension. The strips are adapted to be wound singly about a form which may be of any suitable construction, as for instance a gas pipe herein indicated at 6, the first strip being wound diagonally about the form throughout its entire length, and the second strip of foraminated material wound about the first diagonally in an opposite direction with relation thereto, thus covering the joint or meeting edges of the adjacent convolutions of the first strip. Any number of these strips may be employed as found necessary, but as the resiliency of the tire depends largely upon the number of these strips employed, such number will necessarily depend upon the size of the tire consistently with the weight of the vehicle with which it is intended to be used. However, irrespective of the number of strips employed, the latter are alternately wound diagonally in opposite directions, one upon the other throughout the entire length of the form. When the last strip of the foraminated material has been properly wound about the form it must be secured to prevent unwinding of the same, which may be accomplished in any suitable manner, but as shown in this instance I employ a single strand of suitable wire 7, which is wrapped tightly about the finally wound strip throughout its entire length and fastened at each end thereto.

Subsequent to the securing of the finally wound foraminated strip, I make use of a number of fabric or cloth strips, preferably constructed from canvas, and two in number. However any number of these strips may be employed and are herein indicated at 8. The first of these strips is wound upon the finally wound foraminated strip 5 diagonally in an opposite direction with respect to the latter, while the second of these strips is wound diagonally about the first in an opposite direction with relation thereto. These strips 8 provide a covering for the interstices of the foraminated strip, and serve to prevent mud or other foreign matter from working its way into the core which would obviously affect the resiliency of the tire. In addition to this fact the canvas strips tend to deaden the sound of the tire when in use, preventing rattling as will be readily understood. It is of course to be understood, that subsequent to the removal of the form 6, a hollow core is provided, and that the ends thereof are arranged in contacting engagement. In winding the fabric strips 8 about the foraminated strips 5, the former are started about three or four inches short of one end of the core, so as to run approximately the same distance beyond the opposite end thereof whereby the protruding end of the fabric strips provide a covering for the joint between the adjacent ends of the core. The fabric strips may be secured about the core in any suitable manner. With a core of this construction I employ a casing indicated generally at B, which consists of a plurality of resilient steel wires 9 suitably spaced and arranged to provide a casing of usual cross sectional configuration. The two innermost wires 9' are relatively large as shown for the purpose of permitting the tire in its entirety to be effectively clamped upon the felly of the wheel in the ordinary well-known manner. The wires 9 may be of any suitable dimension and are preferably crimped so that the transverse wires 10 interwoven between the wires 9 are received within the crimped portions of the latter so as to prevent relative movement between these parts. In the manufacture of the casing the wires 9 have their adjacent ends normally spaced and subsequent to the weaving of the casing, these adjacent ends are drawn taut and welded together with a welding machine of suitable construction. The casing must be woven partly shaped, but must be left open wide enough to allow the core to be arranged within the casing when the latter is completed. Subsequent to the positioning of the core within the casing, the latter is drawn closed and held in this position by means of suitable clamps 11, until the tire in its entirety is placed upon the felly of the wheel and fastened thereto by means of the usual demountable rim. The clamps are then removed and the tire is ready for use. By reason of the resiliency of the core and its specific construction, the latter supports the casing to permit the casing to yield in any direction, thereby absorbing all shocks incident to the travel of the vehicle over irregular surfaces.

A tire constructed in accordance with my invention will outwear the tire of the present day use, the combined resiliency of both the core and casing attributing to the tire all the advantages of the pneumatic tire, and by reason of the fact that my tire cannot be punctured, it is in this respect far superior to the pneumatic tire.

It is believed that from the foregoing description the nature and advantages of the invention will be thoroughly understood, but it is desired to be stated that I do not limit myself to the precise construction and arrangement of parts herein shown and described, as the same is merely illustrative of one embodiment of the invention, and various changes may be resorted to when desired as fall within the scope of the appended claims.

What is claimed is:—

1. A tire comprising a transversely split core consisting of a plurality of resilient foraminated strips wound diagonally in opposite directions one upon the other, a plurality of fabric strips wound diagonally in opposite directions about said core, said last mentioned strips when wound protruding beyond one end of the core and providing a covering for the joint between the adjacent ends of the latter, and a casing for said core.

2. A tire comprising a core consisting of a plurality of resilient foraminated strips wound diagonally in opposite directions one upon the other, a plurality of fabric strips wound diagonally in opposite directions about said core and providing a covering for the interstices in said foraminated strips, and a foraminated casing for said core consisting of a plurality of interwoven resilient wires.

In testimony whereof I affix my signature in presence of two witnesses.

ROY J. BARTHOLOMEW.

Witnesses:
  W. T. STRIKING,
  D. M. WENRICK.

Copies of this patent may be obtained for five cents each, by addressing the "Commissioner of Patents, Washington, D. C."